United States Patent [19]

Iwai et al.

[11] Patent Number: 4,962,880
[45] Date of Patent: Oct. 16, 1990

[54] METHOD OF FORMING A HEAT EXCHANGER WITH COMPONENTS COMPRISING AN ALUMINUM ALLOY CONTAINING REDUCED AMOUNTS OF MAGNESIUM

[75] Inventors: Ichiro Iwai, Tochigiken; Shigekazu Nagai, Osaka; Tatsuo Otsuka, Tochigiken, all of Japan

[73] Assignee: Showa Aluminum Kabushiki Kaisha, Osaka, Japan

[21] Appl. No.: 504,040

[22] Filed: Apr. 3, 1990

Related U.S. Application Data

[63] Continuation of Ser. No. 311,162, Feb. 15, 1989, abandoned, and a continuation-in-part of Ser. No. 101,583, Sep. 28, 1987, abandoned.

[30] Foreign Application Priority Data

Sep. 30, 1986 [JP] Japan ................................ 61-234097

[51] Int. Cl.⁵ .................... B23K 1/19; B23K 101/14; B23K 103/10
[52] U.S. Cl. .................................. 228/183; 228/223; 228/263.17
[58] Field of Search ................... 228/183, 223, 263.17, 228/207; 148/26

[56] References Cited

U.S. PATENT DOCUMENTS

| | | |
|---|---|---|
| 3,951,328 | 4/1976 | Wallace et al. ............... 228/207 |
| 4,556,165 | 12/1985 | Yamawaki et al. ........... 228/263.17 |
| 4,560,625 | 12/1985 | Kaifu et al. .................. 228/263.17 |
| 4,705,206 | 11/1987 | Kamiya et al. ............... 228/183 |

FOREIGN PATENT DOCUMENTS 140765 6/1988 Japan ............................ 228/263.17

Primary Examiner—Sam Heinrich

[57] ABSTRACT

A method of forming a heat exchanger includes brazing heat exchanger components with a flux of non-corrosive fluoride complexes. The components comprise an aluminum alloy having improved brazing characteristics and containing 0.3 to 0.8% Mg, 4.0 to 8.0% Zn, one or more of 0.05 to 0.30% Zr, 0.05 to 0.30% Mn, 0.05 to 0.30% of Cr, 0.05 to 0.30% of Cu, aluminum and unavoidable impurities.

9 Claims, 1 Drawing Sheet

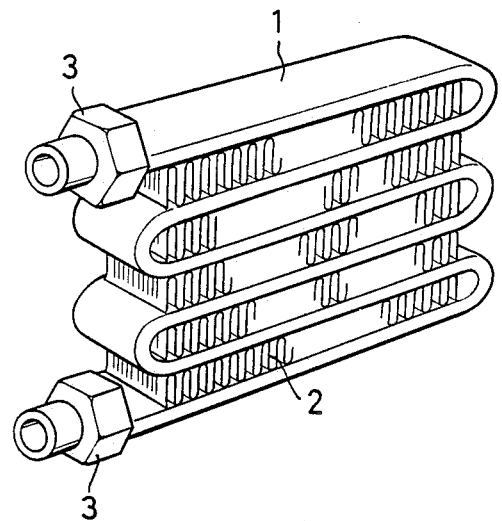

METHOD OF FORMING A HEAT EXCHANGER WITH COMPONENTS COMPRISING AN ALUMINUM ALLOY CONTAINING REDUCED AMOUNTS OF MAGNESIUM

This application is a continuation of application Ser. No. 311,162, filed Feb. 15, 1989, now abandoned and is a continuation-in-part of application Ser. No. 101,583, filed Sept. 28, 1987, now abandoned.

BACKGROUND OF THE INVENTION

1. Field of the Invention

The present invention relates to a method of forming heat exchangers using an aluminum alloy suitable for heat exchanger components, wherein the term "heat exchangers" includes condensers and evaporators for automobile cooling systems. More particularly, the present invention relates to a method of forming heat exchangers with aluminum alloys having such improved brazing characteristics as to be suited for heat exchanger components assembled by brazing with a flux of fluoride complexes.

In this Specification, the percentages are represented by weight.

2. Description of the Prior Art

The heat exchanger used as a evaporator or condenser in automobile cooling systems comprises aluminum tubular elements bent in a zigzag form, and a corrugated fins interposed between the elements. In such heat exchangers, the tubular elements are connected to coolant conductors with the use of union joints and various types of connectors.

The known heat exchangers are composed of tubular elements of pure aluminum alloy such as A1100 or A1050, and fins covered with a brazing sheet, wherein the brazing sheet is made of a core of aluminum alloy such as A3003, clad in a covering of BA4045 or BA4047 alloy. The known joint members are generally made of A7N01 alloy because of its good workability and strength (hardness). The A7N01 alloy contains 1.0 to 2.0% of Mg, 4.0 to 5.0% of Zn, and 0.20 to 0.7% of Mn, the remainders of which are aluminum and unavoidable impurities. The A7N01 alloy contains 1.2% of Al, 4.5% of Mg, and 0.15% of Mn.

Under the known methods, the tubes, conductors and fins are joined to each other by brazing. The brazing agent contains flux, such as alkali metal chlorides or alkaline earth metal chlorides. Recently, fluorine flux has been put into use because of its non-corrosive nature. For example, U.S. Pat. No. 3,951,328 discloses a flux which consists essentially of potassium fluoaluminate complexes and essentially free of unreacted potassium fluoride. Such fluorine fluxes are non-hygroscopic, chemically stable, and leave no corrosive residue after the components are brazed to each other. The use of fluorine flux eliminates the necessity of cleaning the brazed joints out of the flux residue after the brazing is finished. This is advantageous over the chlorine fluxes.

However, the problem is that though the fluorine fluxes are effective for joining the tubes to the fins, they are not suitable for joining the tubes to the joint members because of the resulting small fillets. When the fillets are small, the joint is liable to break. To overcome this difficulty, it is proposed that the tubes are first brazed to the fins with a fluorine flux in a furnace filled with a non-oxidizing gas, and then the joint members are brazed to the tubes by torch. The process requires at least two steps. This takes time, and increases the production cost.

The inventors have tried to discover why the fluorine fluxes are unsuitable for joining the tubes to the joint members, and discovered that it is due to the presence of magnesium contained therein in a relatively large quantity. The magnesium reacts with the fluorine in the fluxes, thereby negating the fluxing action of fluorine.

OBJECTS AND SUMMARY OF THE INVENTION

The present invention aims at solving the problems pointed out above, and has for its object a method of forming heat exchangers using an aluminum alloy suitable for heat exchanger components assembled by brazing with a flux of fluorine complexes, the alloy having improved brazing characteristics with respect to each other, thereby securing a permanent, firm joint between them.

Other objects and advantages of the present invention will become more apparent from the following detailed description, when taken in conjunction with the accompanying drawing which shows, for the purpose of illustration only, one embodiment in accordance with the present invention.

The basic principal underlying the present invention is that in this method of forming heat exchangers, the magnesium content is reduced in the aluminum-based alloy heat exchanger component which results in decreased hardness. The decrease in strength must be compensated for by adding a suitable element. The present invention has adopted zinc as the suitable element.

According to the present invention, there is provided a method of forming heat exchangers comprising an aluminum alloy suitable for heat exchanger components assembled by brazing with a flux of fluoride complexes, the alloy containing 0.3 to 0.8% of Mg, 4.0 to 8.0% of Zn, and one or more of 0.05 to 0.30% of Zr, 0.05 to 0.30% of Mn, 0.05 to 0.30% of Cr, and 0.05 to 0.30% of Cu, the balance being aluminum and unavoidable impurities.

BRIEF DESCRIPTION OF THE DRAWING

The drawing is a perspective fragmentary view particularly showing an assembled unity of joint members, a tube and fins in a typical heat exchanger.

DETAILED DESCRIPTION OF THE PREFERRED EMBODIMENT

In the drawing, the tube 1 is made of A1100 alloy, and bent in a zigzag form, having a path (not shown) therein for passing a coolant through. The fin 2 is a corrugated plate covered with a brazing sheet. The fin plate 2 is brazed to the tube 1. In the illustrated embodiment, a joint member 3 is connected to each terminating end of the tube 1 in such a manner that the coolant path in the tube communicates with a bore of the joint member. The joint member 3 is made of the alloy of the present invention.

Magnesium is added to the alloy so as to increase strength, especially to maintain the hardness above a required value after age-hardening. To achieve this at least 0.3% or more of magnesium is required. However, it is preferred that the quantity of magnesium is less than that contained in the A7N01 alloy of which the joint members are made. The upper limit is 0.8%. If the amount of magnesium contained is greater than 0.8%, the magnesium will react with the fluorine contained in the flux, thereby negating the fluxing action thereof. This leads to a poor joint between the joint member and the tube. The optimum quantity of magnesium ranges from 0.4 to 0.5%.

Zinc is also effective in increasing the strength of the alloy. Taking advantage of this property, a quantity of zinc correlative to the reduce amount of magnesium is added so as to compensate for the reduction in strength. The optimum quantity of zinc ranges from 4.0 to 8.0%. If the amount of zinc is smaller than 4.0%, the strength will decrease after brazing, whereas if there is more than 8.0% zinc, the alloy will be liable to corrosion, and become brittle. The optimum quantity of zinc ranges from 5.1 to 7.0.

Zr, Mn, Cr and Cu are equally effective to improve the brittle property of the alloy, but a smaller amount than 0.05% will never be effective, and a greater amount than 0.3% would not produce better results. The optimum ranges are as follows: Zr: 0.10 to 0.20%, Mn: 0.10 to 0.20%, Cr: 0.05 to 0.15%, Cu: 0.15 to 0.25%.

Fe and Si are unavoidably contained as impurities, but as long as their quantities are small, they will be conducive to increasing strength. However, the corrosion resistance decreases. The quantities of Fe and Si must be limited to 0.3% or less.

The fluoride complexes may be any conventional complex known to a skilled worker in the art. For example, a fluorine flux may contain KF and $KAlF_4$. The complexes may be used in amounts effective to braze the components of the heat exchanger.

The method of the present invention comprises brazing components, including tubular elements, fins and joint members with a flux of fluoride complexes in a furnace filled with a non-oxidizing atmosphere to form the heat exchanger. The body of the heat exchanger comprises tubular elements each bent in a zigzag form with corrugated fins interposed between the tubular elements as shown in the drawing. According to this method, the component parts such as the tubular elements, fins and the metal joint members can be brazed to each other at the same time with fluorine flux in an non-oxidizing atmosphere. The metal joint members contain magnesium in high quantities, i.e. over 0.8%, which diminishes the effectiveness of the fluorine flux. Reducing the magnesium content of the metal joint members causes softening of the metal joints. To compensate for the reduced magnesium content, an increased amount of zinc is added to the aluminum alloy by the method of the present invention.

The invention will be better understood from the example below:

Test pieces were made of the aluminum alloys listed in Table 1. Molten alloys were cast into billets, and then subjected to a homogenizing treatment at 480° C. for 10 hours. The billets were preheated to 400° C. and extruded through an extruder. The extruded masses were subjected to a $T_6$ tampering, and then cut into the test pieces.

For brazing, a fluoride flux containing 8.3% KF and 91.4% $KAlF_4$ was dissolved into a 10% dispersion. The objects to which the test pieces were to be joined were submerged in the dispersion. After the test pieces were dried, they were brazed to the objects at an atmosphere of $N_2$ gas at 600° C. for five minutes with the use of an A4047 alloy as a brazing agent.

TABLE 1

| Test pieces NO. | COMPOSITION (weight %) | | | | | | |
|---|---|---|---|---|---|---|---|
| | Mg | Zn | Zr | Cu | Cr | Mn | Al |
| 1 | 0.35 | 4.2 | — | 0.20 | — | — | Bal. |
| 2 | 0.40 | 6.8 | 0.14 | 0.23 | — | — | Bal. |
| 3 | 0.40 | 5.1 | 0.10 | 0.15 | 0.05 | 0.10 | Bal. |
| 4 | 0.45 | 6.5 | 0.15 | — | — | — | Bal. |
| 5 | 0.50 | 7.0 | 0.20 | 0.25 | 0.15 | 0.20 | Bal. |
| 6 | 0.70 | 5.3 | — | 0.13 | 0.13 | 0.18 | Bal. |
| 7 | 0.78 | 7.4 | — | — | 0.07 | 0.25 | Bal. |
| 8 | 0.2 | 9.0 | — | 0.24 | — | — | Bal. |
| 9 | 0.4 | 3.6 | — | — | — | 0.10 | Bal. |
| 10 | 0.4 | 9.5 | 0.10 | — | — | — | Bal. |
| 11 | 0.7 | 2.8 | — | 0.20 | 0.12 | — | Bal. |
| 12 | 0.7 | 10.5 | — | — | — | — | Bal. |
| 13 | 1.2 | 4.5 | 0.13 | 0.10 | 0.22 | 0.15 | Bal. |

(Note)
Test pieces numbered 1–7 are made of the alloy of the invention.
Test pieces numbered 8–13 are made of the comparative alloy.
Bal. stands for balance.

The brazed conditions of the test pieces were examined and compared. After a month's age-hardening was over, the hardness of each test piece was examined. In addition, the smoothness with which each test piece was extruded through the extruder was examined. The results are shown in Table 2. The evaluation terms are as follows:

(Extruding ability)
G(good): better than the 7N01 alloy
F(fair): equal to the 7N01 alloy
(Brazing ability)
G(good): well joined
B(bad): poorly joined
(Corrosion resistance and anti-stress ability)
G(good): better than the 7N01 alloy
B(bad): inferior to the 7N01 alloy
(Hardness)
G(good): Vickers' hardness a month after the brazing was carried out: Hv greater and or equal to 80
B(bad): Vickers' hardness a month after the brazing was carried out: Hv less than 80
(General Evaluation)
G(good): All of the pieces are satisfactory
F(fair): Some of the pieces are unsatisfactory
B(bad): All of the pieces are unsatisfactory

TABLE 2

| Test Piece No. | Extruding Ability | Brazing Ability | Hardness (Hv) | Anti-Stress | GE |
|---|---|---|---|---|---|
| 1 | G | G | G | G | F |
| 2 | G | G | G | G | G |
| 3 | G | G | G | G | G |
| 4 | G | G | G | G | G |
| 5 | G | G | G | G | G |
| 6 | G | G | G | G | G |
| 7 | G | G | G | G | F |
| 8 | G | G | B | B | B |
| 9 | G | G | B | G | B |
| 10 | G | G | G | B | B |
| 11 | G | G | B | G | B |
| 12 | F | G | G | B | B |
| 13 | F | B | G | G | B |

(Note)
GE stands for general evaluation.
Test pieces numbered 1–7 are made of the alloy of the invention.
Test pieces numbered 8–13 are made of the comparative alloys.

As is evident from Table 2, the test pieces No. 1 to 11 exhibit a good extruding ability and brazing ability. However, in order to be suited for heat exchanger components, the alloys must have Vickers' hardness of at least 80 Hv. If the hardness is less than 80 Hv, the alloys are likely to become deformed when they are tightened up. Test pieces No. 8, 9 and 11 are finally evaluated as unsatisfactory. Test pieces No. 10 and 12 maintain satisfactory hardness after age-hardening but are disadvantageously liable to corrosion and stress because of the relatively large content of zinc. The test piece No. 13 made of A7N01 alloy in ordinary use was found inferior in the brazing ability.

The test pieces No. 1-7 of the invention exhibit better extruding ability than the A7N01 alloy. This indicates that the alloy of the invention is suited for fabricating joint members. In addition, they are equal to A7N01 alloys in brazing ability, hardness, corrosion-resistance and anti-stress (anti-SCC). However, some of the test pieces No. 1 are inferior in hardness, and some of the test pieces No. 7 are inferior in brazing ability. Nevertheless, the defectiveness of the test pieces in these categories is actually negligible in practice.

What is claimed is:

1. A method for fabricating a heat exchanger, which comprises:

providing components including tubular elements, fins and joint members, said joint members being made of aluminum-based alloy consisting essentially of 0.3 to 0.8% Mg, 5.1 to 7.0% Zn, and one or more of 0.05 to 0.30% Zr, 0.05 to 0.30% Mn, 0.05 to 0.30% Cr, 0.05 to 0.30% Cu, and the balance being aluminum and unavoidable impurities; brazing said components to form a heat exchanger with a flux of fluoride complexes in a furnace filled with a non--oxidizing atmosphere.

2. A method as defined in claim 1, wherein the body of the heat exchanger comprises tubular elements each bent in a zigzag form and corrugated fins interposed between the tubular elements.

3. A method as defined in claim 1, wherein the content of Mg ranges from 0.4% to not greater than 0.5%.

4. A method as defined in claim 1, wherein the content of Zr ranges from 0.10% to 0.20%.

5. A method as defined in claim 1, wherein the content of Mn ranges from 0.10% to 0.20%.

6. A method as defined in claim 1, wherein the content of Cr ranges from 0.05% to 0.15%.

7. A method as defined in claim 1, wherein the content of Cu ranges from 0.15% to 0.25%.

8. A method as defined in claim 1, wherein the joint members consist essentially of 0.4% to not greater than 0.5% Mg, 5.1 to 7.0% Zn, and one or more of 0.05 to 0.30% Zr, 0.05 to 0.30% Mn, 0.05 to 0.30% of Cr, 0.05 to 0.30% of Cu, the balance being aluminum and unavoidable impurities.

9. A method as defined in claim 1, wherein the joint members consist essentially of 0.4% to not greater than 0.5% Mg, 5.1 to 7.0% Zn, and one or more of 0.10 to 0.20% Zr, 0.10 to 0.20% Mn, 0.05 to 0.15% of Cr, 0.15 to 0.25% of Cu, the balance being aluminum and unavoidable impurities.

* * * * *